US 008706817B2

(12) United States Patent
Daniels et al.

(10) Patent No.: US 8,706,817 B2
(45) Date of Patent: Apr. 22, 2014

(54) SENDER MANAGED MESSAGE PRIVACY

(75) Inventors: Fonda J. Daniels, Cary, NC (US); Ruthie D. Lyle, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 1816 days.

(21) Appl. No.: 11/186,361

(22) Filed: Jul. 21, 2005

(65) Prior Publication Data
US 2007/0022165 A1 Jan. 25, 2007

(51) Int. Cl.
*G06F 15/16* (2006.01)

(52) U.S. Cl.
USPC .......................................... 709/206

(58) Field of Classification Search
USPC ................................. 709/205–207
See application file for complete search history.

(56) References Cited

U.S. PATENT DOCUMENTS

| | | | |
|---|---|---|---|
| 6,430,604 B1 | 8/2002 | Ogle et al. | |
| 2002/0178231 A1 | 11/2002 | Matsa et al. | |
| 2003/0023691 A1 | 1/2003 | Knauerhase | |
| 2003/0046421 A1* | 3/2003 | Horvitz et al. | 709/238 |
| 2003/0236847 A1* | 12/2003 | Benowitz et al. | 709/206 |
| 2004/0078445 A1 | 4/2004 | Malik | |
| 2004/0143633 A1 | 7/2004 | McCarty | |
| 2004/0158609 A1 | 8/2004 | Daniell et al. | |
| 2004/0168055 A1 | 8/2004 | Lord et al. | |
| 2004/0254998 A1* | 12/2004 | Horvitz | 709/206 |
| 2005/0204008 A1* | 9/2005 | Shinbrood | 709/206 |

\* cited by examiner

*Primary Examiner* — Shirley Zhang
(74) *Attorney, Agent, or Firm* — Steven M. Greenberg, Esq.; CRGO Law

(57) ABSTRACT

Embodiments of the present invention address deficiencies of the art in respect to securing the privacy of messages and provide a method, system and computer program product for sender managed message privacy. In an embodiment of the invention, a data processing system for sender managed privacy can include a sender messaging client coupled to privacy management logic and configured for communicative linkage to a recipient messaging client coupled to proximity detection logic over a data communications network. The privacy management logic can include program code enabled to secure a message designated for delivery in the recipient messaging client responsive to the proximity detection logic.

23 Claims, 2 Drawing Sheets

SENDER MANAGED MESSAGE PRIVACY

BACKGROUND OF THE INVENTION

1. Field of the Invention

The present invention relates to the field of human-to-human messaging systems and more particularly to securing the content of messages in a human-to-human messaging system.

2. Description of the Related Art

Electronic mail, referred to in the art as e-mail, has proven to be the most widely used computing application globally. Though e-mail has been a commercial staple for several decades, due to the explosive popularity and global connectivity of the Internet, e-mail has become the preferred mode of asynchronous communications, regardless of the geographic separation of communicating parties. Today, more e-mails are processed in a single hour than phone calls. Clearly, e-mail as an asynchronous mode of communications has been postured to replace all other modes of communications excepting voice telephony.

In contrast to the asynchronous nature of e-mail, the recent rapid development of the Internet has led to advanced modes of synchronous, real-time collaboration able to fulfill the real-time communicative requirements of the modern computing participant. Using the Internet as a backbone, individuals worldwide can converge in real-time in cyberspace to share ideas, documents and images in a manner not previously possible through conventional telephony and video conferencing. To facilitate collaboration over the Internet, a substantial collection of synchronous messaging technologies and protocols have been assembled to effectively deliver audio, video and data over the single data communications medium of the Internet. These synchronous messaging technologies include several, real-time human-to-human collaborative environments such as instant messaging and persistent chat rooms.

Regardless of whether one considers synchronous or asynchronous modes of communication, security in the transmission of electronic messages can be of paramount concern, not only to the recipient of the message, but also to the sender of the message. Generally, security for messaging implies the encryption of a message such that only an intended recipient can decrypt the message to view its content. Managing the encryption and decryption of every transmitted and received message, however, can be cumbersome. In particular, where a recipient can view messages in a private setting, encryption will not be required. Yet, there are times where the presence of other users can compromise the security of the content of a message.

In most cases, the recipient of a message can determine when persons are present so as to avoid viewing a private message. The sender of the message, however, can have no involvement in the determination of when a message is to be obscured from view of others. In many instances it would be desirable to empower the sender of a message to control the privacy of a message; yet, the sender of the message ought to be empowered to control the privacy of a message without requiring the recipient of the message to manage an encryption and decryption process for every received message.

BRIEF SUMMARY OF THE INVENTION

Embodiments of the present invention address deficiencies of the art in respect to securing the privacy of messages and provide a novel and non-obvious method, system and computer program product for sender managed message privacy. In an embodiment of the invention, a data processing system for sender managed privacy can include a sender messaging client coupled to privacy management logic and configured for communicative linkage to a recipient messaging client coupled to proximity detection logic over a data communications network. The privacy management logic can include program code enabled to secure a message designated for delivery in the recipient messaging client responsive to the proximity detection logic.

In another embodiment, a computer-implemented method for sender managed privacy can include designating a recipient for a message, proximity detecting a person other than the designated recipient, and securing the message responsive to the proximity detecting before permitting the designated recipient to view the message. The message can include an instant message, an electronic mail message or a chat message, to name a few.

Securing the message can include delaying delivery of the message responsive to the proximity detecting. Also, securing the message can include redirecting the message to a voice mail for the designated recipient responsive to the proximity detecting. Securing the message further can include redirecting the message to a different message client for the designated recipient responsive to the proximity detecting. Securing the message yet further can include obfuscating the message responsive to the proximity detecting. Finally, securing the message can include encrypting the message responsive to the proximity detecting.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for sender managed message privacy. In accordance with an embodiment of the present invention, a sender can determine whether a person other than an intended recipient is proximate to the recipient. If another person is proximate to the recipient, depending upon the identity of the other person, restrictions on the delivery of the message can be imposed, including encrypting the message, or delaying delivery of the message until it is determined that the other person no longer is in proximity to the recipient. Optionally, in an urgent or time sensitive circumstance, the message can be delivered using alternative means.

Figure 1:
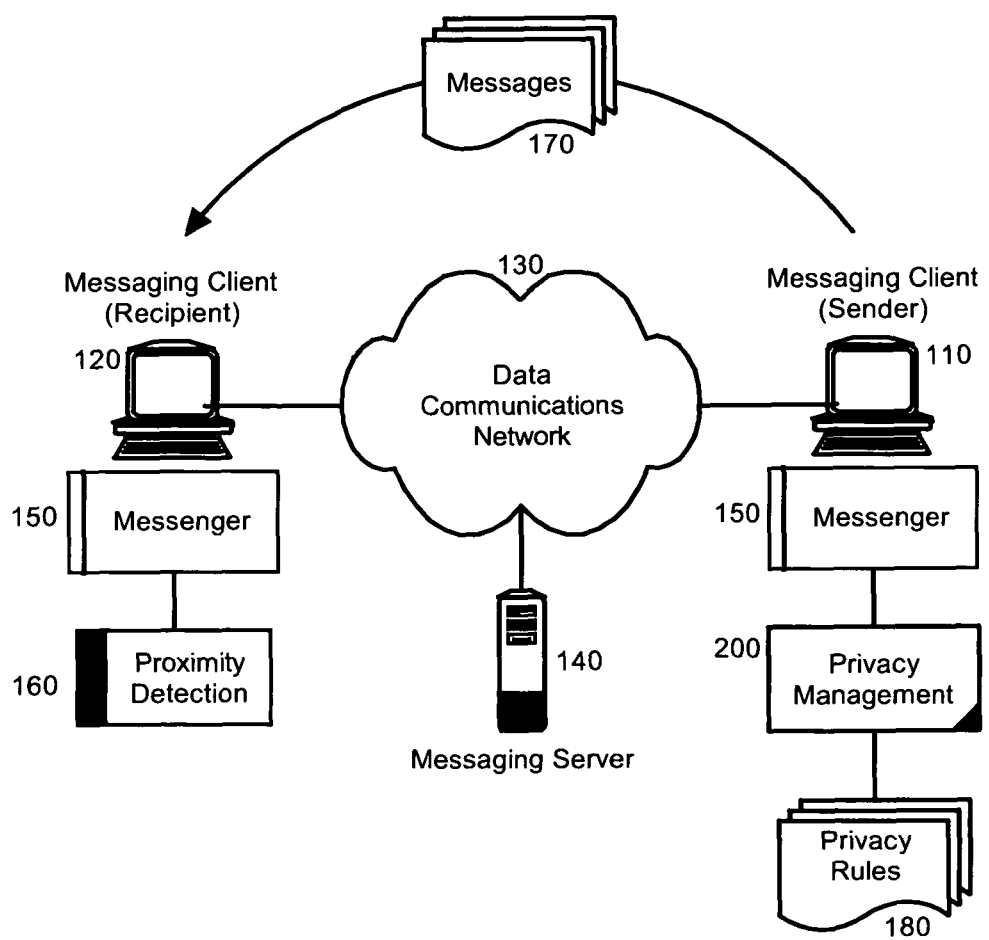
FIG. 1 is a schematic illustration of a messaging system configured for sender managed message privacy; and, FIG. 2 is a flow chart illustrating a process for sender managed message privacy.

In more detailed explanation of an embodiment of the present invention, FIG. 1 is a schematic illustration of a messaging system configured for sender managed message privacy. The system can include a messaging client 110 configured with messaging logic 150. The messaging client 110 can be communicatively linked to another messaging client 120 also configured with messaging logic 150. In this way, the messaging client 110 (acting as a sender) can transmit messages 170 over the data communications network 130 to the messaging client 120 (acting as a recipient). Optionally, a messaging server 140 can facilitate the exchange of messages 170 between the messaging clients 110, 120, although the messaging clients 110, 120 need not reside in the same messaging network and the messaging clients 110, 120 can reside in different messaging networks. As an example, the messaging clients 110, 120 can include e-mail clients, instant messaging clients or chat room clients.

Notably, privacy management logic 200 can be coupled to the messenger 150 associated with the messaging client 110 and communicatively linked to proximity detection logic 160 coupled to the messenger 150 associated with the messaging client 120. The proximity detection logic 160 can include presence detecting circuitry and presence based security logic as is well known in the art. Presence detecting circuitry can include circuitry suitable for sensing the presence of a sensor device, examples of which include a radio frequency identification tag, a magnetic sensor, or a smart card, to name a few, as is well-known in the retail security arts.

The privacy management logic 200 can include program code enabled to communicate with the proximity detection logic 160 to determine when a person is in proximity to the messaging client 120. The program code of the privacy management logic 200 further can be enabled to restrict the transmission of messages 170 to the messaging client 120 when a person is detected in proximity to the messaging client 120. The nature of the restriction can vary according to privacy rules 180 and can range from withholding the messages 170 in a queue until the detected person is no longer detected, to forwarding the messages 170 to an alternative messaging client 120.

Figure 2:
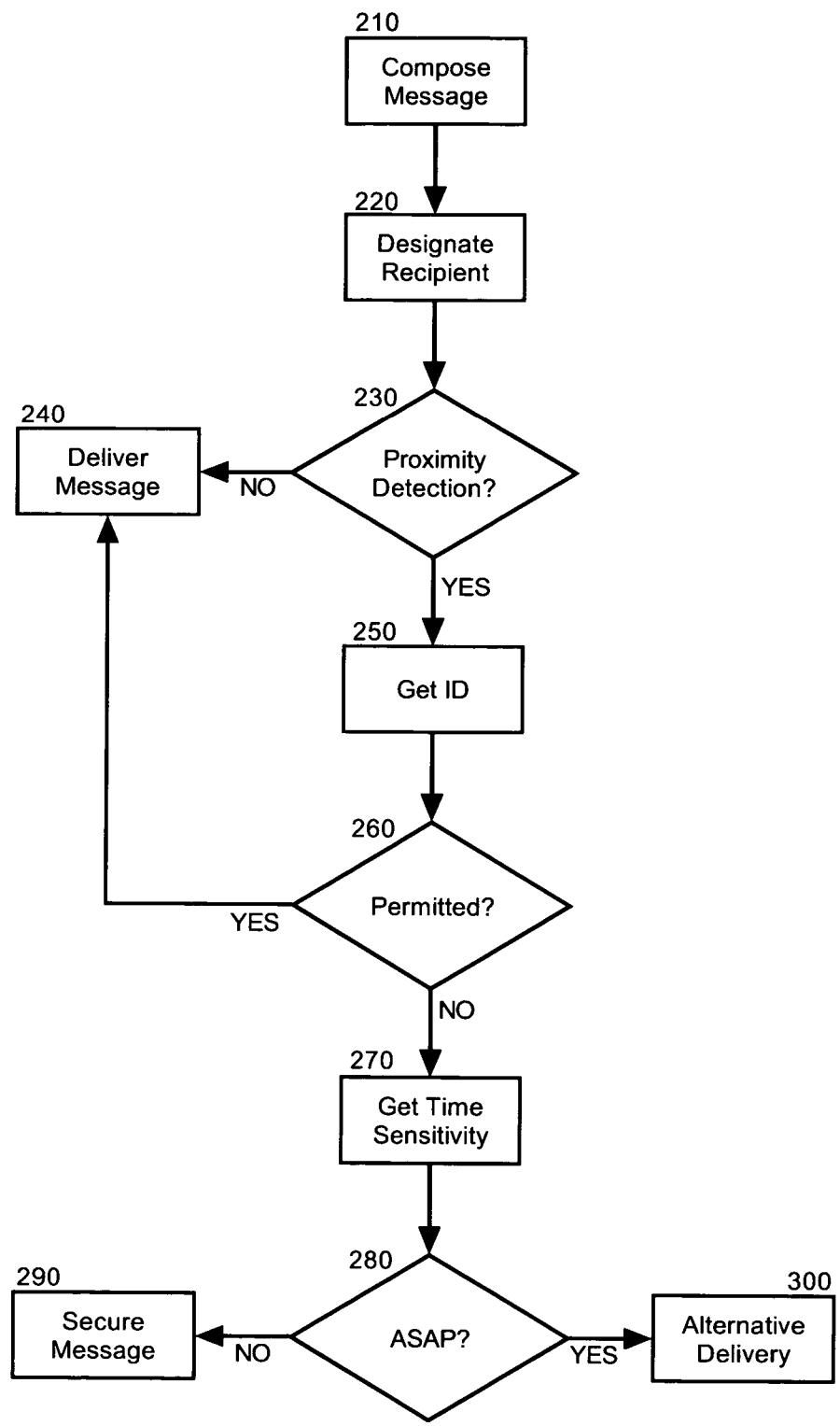

In more particular illustration, FIG. 2 is a flow chart illustrating a process for sender managed message privacy. Beginning in block 210, a message can be composed, for example an instant message or an e-mail. In block 220, a recipient can be designated to receive the message. In decision block 230, it can be determined whether a person other than the recipient is proximate to the recipient. If not, the message can be delivered in block 240. Otherwise, in block 250, the other person can be identified and in block 260, it can be determined whether the identity of the other person is such that delivery of the message can proceed. If so, in block 240 the message can be delivered. Otherwise, the process can continue in block 270.

In block 270, the time sensitivity of the message can be obtained and it can be determined in block 280 whether the delivery of the message is of a time sensitive nature. If not, the message can be secured in block 290. Securing the message can include password protecting, encrypting or otherwise obfuscating the message. Securing the message also can include delaying the delivery of the message in a message queue. By comparison, if in decision block 280, it is determined that the delivery of the message is of a time sensitive nature, in block 300, the message can be delivered to the recipient using alternative means. For example, the message can be delivered to an instant messaging client where the message is an e-mail, or to an e-mail client where the message is an instant message. Alternatively, the message can be delivered as a voice mail, or a voice mail can be delivered alerting the recipient to the existence of the message.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system for sender managed privacy comprising:

a data processing system comprising at least one processor coupled to memory elements through a system bus;

privacy management logic executing in the memory by the at least one processor in the data processing system;

a sender messaging client coupled to the privacy management logic and configured for communicative linkage to a recipient messaging client coupled to proximity detection logic over a data communications network;

said privacy management logic comprising program code enabled to secure a message designated for delivery to a designated recipient in said recipient messaging client responsive to said proximity detection logic detecting a person other than the designated recipient, wherein the message is secured by determining whether an identity of the person other than the designated recipient is such that delivery of the message can proceed, upon determining that the identity of the person other than the designated recipient is such that delivery of the message cannot proceed, determining whether the delivery of the message is of a time sensitive nature, upon determining that the delivery of the message is not of a time sensitive nature, securing the message, and upon determining that the delivery of the message is of a time sensitive nature, delivering the message using an alternative means.

2. The data processing system of claim 1, further comprising privacy rules established for use by said privacy management logic in securing said message.

3. The data processing system of claim 1, wherein said sender messaging client and said recipient messaging client are instant messaging clients.

4. The data processing system of claim 1, wherein said sender messaging client and said recipient messaging client are electronic mail clients.

5. The data processing system of claim 1, wherein said sender messaging client and said recipient messaging client are chat clients.

6. The data processing system of claim 1, further comprising presence detecting circuitry coupled to said proximity detection logic, said presence detecting circuitry comprising a configuration for sensing a sensor device.

7. The data processing system of claim 6, wherein said sensor device comprises one of a radio frequency identification tag, a magnetic sensor, and a smart card.

8. A computer-implemented method for sender managed privacy comprising:

designating a recipient for a message;

proximity detecting a person other than said designated recipient; and, securing said message by privacy management logic executing in memory by at least one processor in a data processing system responsive to said proximity detecting the person other than said designated recipient before permitting said designated recipient to view said message, wherein the message is secured by determining whether an identity of the person other than the designated recipient is such that delivery of the message can proceed, upon determining that the identity of the person other than the designated recipient is such that delivery of the message cannot proceed, determining whether the delivery of the message is of a time sensitive nature, upon determining that the delivery of the message is not of a time sensitive nature, securing the message, and upon determining that the delivery of the message is of a time sensitive nature, delivering the message using an alternative means.

9. The method of claim 8, wherein said designating a recipient for a message comprises designating a recipient for an instant message.

10. The method of claim 8, wherein said designating a recipient for a message comprises designating a recipient for an electronic mail message.

11. The method of claim 8, wherein upon determining that the delivery of the message is not of a time sensitive nature, securing the message, comprises delaying delivery of said message responsive to said proximity detecting.

12. The method of claim 8, wherein upon determining that the delivery of the message is of a time sensitive nature, delivering the message using an alternative means, comprises redirecting said message to a voice mail for said designated recipient responsive to said proximity detecting.

13. The method of claim 8, wherein upon determining that the delivery of the message is of a time sensitive nature, delivering the message using an alternative means, comprises redirecting said message to a different message client for said designated recipient responsive to said proximity detecting.

14. The method of claim 8, wherein upon determining that the delivery of the message is not of a time sensitive nature, securing the message, comprises obfuscating said message responsive to said proximity detecting.

15. The method of claim 8, wherein upon determining that the delivery of the message is not of a time sensitive nature, securing the message, comprises encrypting said message responsive to said proximity detecting.

16. A computer program product comprising a computer usable storage medium having computer usable program code for sender managed message privacy, said computer program product including:

computer usable program code for designating a recipient for a message;

computer usable program code for proximity detecting a person other than said designated recipient; and, computer usable program code for securing said message by privacy management logic executing in memory by at least one processor in a data processing system responsive to said proximity detecting the person other than said designated recipient before permitting said designated recipient to view said message, wherein the message is secured by determining whether an identity of the person other than the designated recipient is such that delivery of the message can proceed, upon determining that the identity of the person other than the designated recipient is such that delivery of the message cannot proceed, determining whether the delivery of the message is of a time sensitive nature, upon determining that the delivery of the message is not of a time sensitive nature, securing the message, and upon determining that the delivery of the message is of a time sensitive nature, delivering the message using an alternative means.

17. The computer program product of claim 16, wherein said computer usable program code for designating a recipient for a message comprises computer usable program code for designating a recipient for an instant message.

18. The computer program product of claim 16, wherein said computer usable program code for designating a recipient for a message comprises computer usable program code for designating a recipient for an electronic mail message.

19. The computer program product of claim 16, wherein upon determining that the delivery of the message is not of a time sensitive nature, securing the message, comprises delaying delivery of said message responsive to said proximity detecting.

20. The computer program product of claim 16, wherein upon determining that the delivery of the message is of a time sensitive nature, delivering the message using an alternative means, comprises redirecting said message to a voice mail for said designated recipient responsive to said proximity detecting.

21. The computer program product of claim 16, wherein upon determining that the delivery of the message is of a time sensitive nature, delivering the message using an alternative means, comprises redirecting said message to a different message client for said designated recipient responsive to said proximity detecting.

22. The computer program product of claim 16, wherein upon determining that the delivery of the message is not of a time sensitive nature, securing the message, comprises obfuscating said message responsive to said proximity detecting.

23. The computer program product of claim 16, wherein upon determining that the delivery of the message is not of a time sensitive nature, securing the message, comprises encrypting said message responsive to said proximity detecting.

\* \* \* \* \*